United States Patent
Liu et al.

(10) Patent No.: US 10,110,659 B2
(45) Date of Patent: Oct. 23, 2018

(54) METHOD AND APPARATUS FOR OBTAINING WEBPAGES

(71) Applicant: TENCENT TECHNOLOGY (SHENZHEN) COMPANY LIMITED, Shenzhen, Guangdong (CN)

(72) Inventors: Jing Liu, Shenzhen (CN); Xiaodan Lin, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 482 days.

(21) Appl. No.: 14/838,050

(22) Filed: Aug. 27, 2015

(65) Prior Publication Data
US 2015/0373082 A1 Dec. 24, 2015

Related U.S. Application Data

(63) Continuation of application No. PCT/CN2014/075365, filed on Apr. 15, 2014.

(30) Foreign Application Priority Data
Apr. 26, 2013 (CN) .......................... 2013 1 0150009

(51) Int. Cl.
*G06F 15/16* (2006.01)
*H04L 29/08* (2006.01)
(Continued)

(52) U.S. Cl.
CPC ............ *H04L 67/02* (2013.01); *G06F 17/273* (2013.01); *G06F 17/30887* (2013.01); *G06F 17/30905* (2013.01); *H04L 67/42* (2013.01)

(58) Field of Classification Search
CPC ... H04L 67/02; G06F 17/273; G06F 17/30887
(Continued)

(56) References Cited

U.S. PATENT DOCUMENTS

2008/0320167 A1* 12/2008 Collignon ......... G06F 17/30887
709/245

FOREIGN PATENT DOCUMENTS

| CN | 101079059 A | 11/2007 |
|---|---|---|
| CN | 101551806 A | 10/2009 |

(Continued)

OTHER PUBLICATIONS

Tencent Technology, ISRWO, PCT/CN2014/075365, dated Jul. 16, 2014, 7 pgs.
(Continued)

*Primary Examiner* — Alan S Chou
(74) *Attorney, Agent, or Firm* — Morgan, Lewis & Bockius LLP

(57) ABSTRACT

The present invention discloses a method and apparatus for obtain webpages. The method comprises: receiving a webpage identifier through a browser; determining whether the webpage identifier comprises an error; if the webpage identifier comprises an error, matching the error with a corresponding correction method in a pre-stored matching table for webpage identifier errors; correcting the webpage identifier in accordance with the matched correction method; and sending the corrected webpage identifier to a server to obtain a corresponding webpage. Errors in the webpage identifier can be automatically corrected, which saves time and enhances the browsing experiences.

7 Claims, 4 Drawing Sheets

(51) Int. Cl.
*G06F 17/30* (2006.01)
*G06F 17/27* (2006.01)
*H04L 29/06* (2006.01)

(58) Field of Classification Search
USPC .......................................................... 709/203
See application file for complete search history.

(56) References Cited

FOREIGN PATENT DOCUMENTS

| CN | 101872350 A | 10/2010 |
|---|---|---|
| CN | 102456063 A | 5/2012 |
| CN | 102566768 A | 7/2012 |
| CN | 102737029 A | 10/2012 |

OTHER PUBLICATIONS

Tencent Technology, IPRP, PCT/CN2014/075365, dated Oct. 27, 2015, 5 pgs.

\* cited by examiner

METHOD AND APPARATUS FOR OBTAINING WEBPAGES

CROSS-REFERENCE TO RELATED APPLICATIONS

This application is a continuation of International Patent Application No. PCT/CN2014/075365, entitled "Method and Apparatus for Obtaining Webpages," filed on Apr. 15, 2014. This application claims the benefit and priority of Chinese Patent Application No. 201310150009.6, entitled "Method and Apparatus for Obtaining Webpages," filed on Apr. 26, 2013. The entire disclosures of each of the above applications are incorporated herein by reference.

TECHNICAL FIELD

The present invention relates to the internet, and more particularly, to a method and apparatus for obtaining webpages.

BACKGROUND

In browsing a webpage, a user can either click on a link of the webpage or enter a web address in the browser's (e.g., a QQ browser) address bar. If the user clicks a webpage link, there usually would be no error in opening the webpage, as the link is typically directly linked to the corresponding webpage.

However, when a user tries to open a webpage through entering a web address in the browser's address bar, errors often occur as the user might enter a character that is not allowed in web address, or use the incorrect format. If a not-allowed character or an incorrect format is entered in the address bar, the intended webpage will not open.

For example, the following errors could easily occur when a user enters a web address: error on punctuation: such as entering "www," instead of "www."; error for using a Chinese punctuation mark: such as entering "www。" instead of "www."; error on blank space: such as entering "www. qq.com" instead of "www.qq.com"; and error on characters: such as entering "ww" or "wwww" instead of "www".

The above mentioned errors occur frequently, yet they are hard to correct, and could lead to the failure to open an intended webpage. Specifically, the Domain Name System (DNS) server cannot resolve a webpage identifier containing an error, and error code (e.g., error 753) will be returned to the browser indicating that the DNS server cannot resolve the web address.

When the above mentioned errors occur, the user usually need to carefully double-check the web address entered, and correct the errors manually until the correct web address is entered. The user would need to take extra time to correct the web address, which is inefficient. In addition, the user's manual correction is not always correct, and the user might have to re-correct the web address if he or she continues to make mistakes in manually entering the web address.

Therefore, there is a need to address the above mentioned issues in the prior art when a user manually enters a web address that contains an error.

SUMMARY OF THE INVENTION

The embodiments of the present invention provide a method and apparatus for obtaining webpages to address the issues in the prior art when a user manually enters a web address that contains an error.

In accordance with embodiments of the present invention, a method for obtaining a webpage is provided, comprising: receiving a webpage identifier through a browser; determining whether the webpage identifier comprises an error; if the webpage identifier comprises an error, matching the error with a corresponding correction method in a pre-stored matching table for webpage identifier errors; correcting the webpage identifier in accordance with the matched correction method; and sending the corrected webpage identifier to a server to obtain a corresponding webpage.

In accordance with embodiments of the present invention, an apparatus for obtaining webpage is provided, comprising: a webpage identifier acquisition module for receiving a webpage identifier through a browser; a webpage identifier error determination module for determining whether the webpage identifier comprises an error; a correction method matching module for, if the webpage identifier comprises an error, matching the error with a corresponding correction method in a pre-stored matching table for webpage identifier errors; a webpage identifier correction method module for correcting the webpage identifier in accordance with the matched correction method; and a webpage acquisition module for sending the corrected webpage identifier to a server to obtain a corresponding webpage.

In the embodiments of the present invention, if it is determined that the webpage identifier received by the browser includes an error, a corresponding correction method is directly matched in a pre-stored matching table for the error in the webpage identifier, the webpage identifier is corrected in accordance with the matched correction method, and a webpage is obtained in accordance with the corrected webpage identifier. Thus, errors in the webpage identifier can be automatically corrected in accordance with embodiments of the present invention, which saves time and enhances the browsing experiences.

DESCRIPTION OF THE PREFERRED EMBODIMENTS

To better illustrate the technical features of the embodiments of the present invention, various preferred embodiments of the present invention will be briefly described in conjunction with the accompanying drawings.

Figure 1:
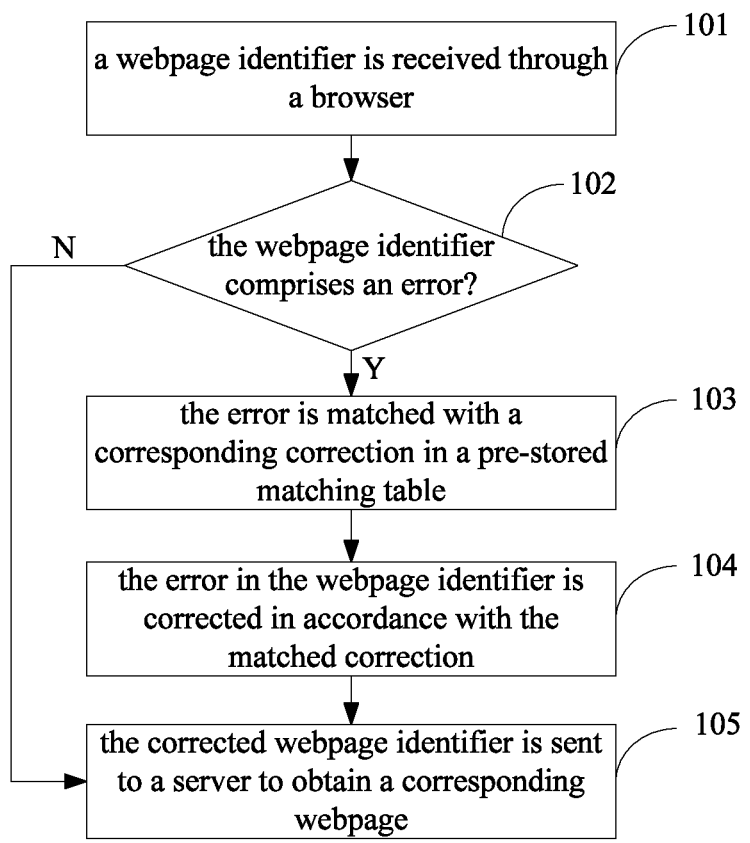
FIG. 1 is an exemplary flowchart of the method for obtaining a webpage in accordance with the an embodiment of the present invention.

FIG. 1 is an exemplary flowchart of the method for obtaining a webpage in accordance with an embodiment of the present invention.

In step 101, a webpage identifier is received through a browser.

In this embodiment, the webpage identifier is preferably an URL, i.e., a web address. In this step, a user enters a webpage identifier through a browser. For example, after a user enters a web address http://news.qq.com/zt2013/lianghui/ into a browser's address bar, the browser receives the web address.

In step 102, it is determined whether the webpage identifier comprises an error. If the webpage identifier comprises an error, step 103 is performed; otherwise, step 105 is performed.

A uniform resource locator, abbreviated URL, also known as web address, is a specific character string that constitutes a reference to a resource. Not all the characters are allowed in a URL, and below is a common list of the allowed URL characters.

Unreserved
May be encoded but it is not necessary
A B C D E F G H I J K L M N O P Q R S T U V W X Y Z
a b c d e f g h i j k l m n o p q r s t u v w x y z
0 1 2 3 4 5 6 7 8 9 - _ . ~
Reserved
Have to be encoded sometimes
! * ' ( ) ; : @ & = + $ , / ? % # [ ]

As you can see from the list of allowed URL characters, the white space character is not an allowed URL character. In addition, all the Chinese punctuation marks, such as the Chinese period "。", the Chinese colon "：", and the Chinese comma "，", are not allowed URL characters. However, the user can inadvertently enter such characters while attending to enter an URL. In accordance with embodiments of the present invention, a URL containing a character that is not an allowed URL character can be corrected, and the not-allowed character can be either deleted or replaced by an allowed character.

In this embodiment, after receiving a webpage identifier through a browser, the browser obtains a webpage from the server in accordance with the webpage identifier. For example, after receiving the web address http://news.qq.com/zt2013/lianghui/, the browser obtains a corresponding webpage for this web address, which contains news report on the meetings of the NPC and CPPCC.

In this embodiment, whether the webpage identifier comprises an error is preferably determined by whether an error code is received from the server. If an error code is received from the server, then it is determined that the current webpage identifier comprises an error. Alternatively, other methods can be used to determine whether the webpage identifier entered by a user comprises an error. For example, after a user enters a webpage identifier into a browser's address bar, the webpage identifier can be checked character by character to determine whether the webpage identifier comprises an error.

In step 103, the error is matched with a corresponding correction method in a pre-stored matching table for webpage identifier errors.

Table 1 below contains a list of error types in the webpage identifier and corresponding correction methods.

TABLE 1

| Error Type | Examples | Correction method |
| --- | --- | --- |
| error on punctuation | Entering "www,", "www;", or "www'", etc. instead of "www." | Changing into "www." |
| | Entering "http;", "http,", or "http.", etc. instead of "http:" | Changing into "http:" |
| | Entering ",com", ";com" or | Changing into ".com" |

TABLE 1-continued

| Error Type | Examples | Correction method |
| --- | --- | --- |
| | "'com", etc. instead of ".com" (same for suffixes such as ".net", ".org", ".edu" etc.) | (or ".net", ".org", ".edu" etc.) |
| | Entering ",cn", ";cn" or "'cn" etc. instead of ".cn" (same for suffixes such as ".hk", ".uk", ".jp" etc.) | Changing into ".cn" (or ".hk", ".uk", ".jp", etc.) |
| error for using a Chinese punctuation mark | Entering "www。" instead of "www." | Changing into "www." |
| | Entering "http：" instead of "http:" | Changing into "http:" |
| | Entering "，com", "；com" or "'com" etc. instead of ".com" (same for suffixes such as ".net", ".org", ".edu" etc.) | Changing into ".com" (or ".net", ".org", ".edu" etc.) |
| | Entering "。cn" instead of ".cn" (same for suffixes such as ".hk", ".uk", ".jp" etc.) | Changing into ".cn" (or ".hk", ".uk", ".jp" etc.) |
| error on blank space | Entering any blank space in an URL | Deleting the blank space |
| error on character | Entering "wwww", or "ww" instead of "www" | Changing into "www" |
| | Entering "htp", "htt", "ttp", "httpp", "hhttp", or "htttp" etc. instead of "http" | Changing into "http" |
| | Entering "cm", "om", "co" "comm", "ccom", or "coom" etc. instead of "com" (same for suffixes such as ".net", ".org", ".edu" etc.) | Changing into ".com" (or ".net", ".org", ".edu" etc.) |
| . . . | . . . | . . . |

In accordance with the embodiment of the present invention, the error type for the error in the webpage identifier entered by the user is first identified, and then the error type is matched with a corresponding correction method. As shown in Table 1, the error types for the error in the webpage identifier includes but not limited to: error on punctuation in the webpage identifier, error on the format of punctuation in the webpage identifier, and error on presence of a character between two punctuations etc.

In step 104, the error in the webpage identifier is corrected in accordance with the matched correction method to obtain a correct webpage identifier.

Once a correction method, such as those shown in Table 1, is matched, the error in the webpage identifier is corrected in accordance with the matched correction method. For example, if the error type for the error in the webpage identifier is an error on punctuation such as "http;", then the corresponding correction method for this error type would be replacing "http;" with "http:".

In step 105, the corrected webpage identifier is sent to a server to obtain a corresponding webpage.

In this embodiment, if it is determined that the webpage identifier received by the browser includes an error, a corresponding correction method is directly matched in a pre-stored matching table for the error in the webpage identifier, the webpage identifier is corrected in accordance with the matched correction method, and a webpage is obtained in accordance with the corrected webpage identifier. Thus, errors in the webpage identifier can be automatically corrected in accordance with embodiments of the present invention, which saves time and enhances the browsing experiences.

Figure 2:
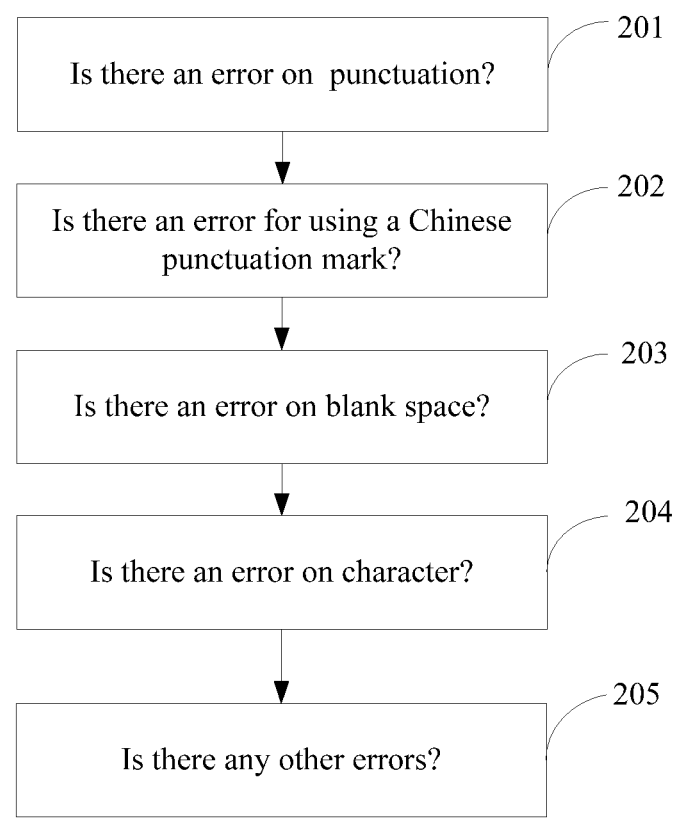
FIG. 2 is an exemplary flowchart of the method for identifying an error in a webpage identifier in accordance with an embodiment of the present invention.

FIG. 2 is an exemplary flowchart of the method for identifying an error type in a webpage identifier in accordance with an embodiment of the present invention. As shown in FIG. 2, the error type in a webpage identifier may be identified using the following steps.

Step 201: Is there an error in punctuation?
Step 202: Is there an error for using a Chinese punctuation mark?
Step 203: Is there an error on blank space?
Step 204: Is there an error on character?
Step 205: Is there any other errors?

Figure 3:
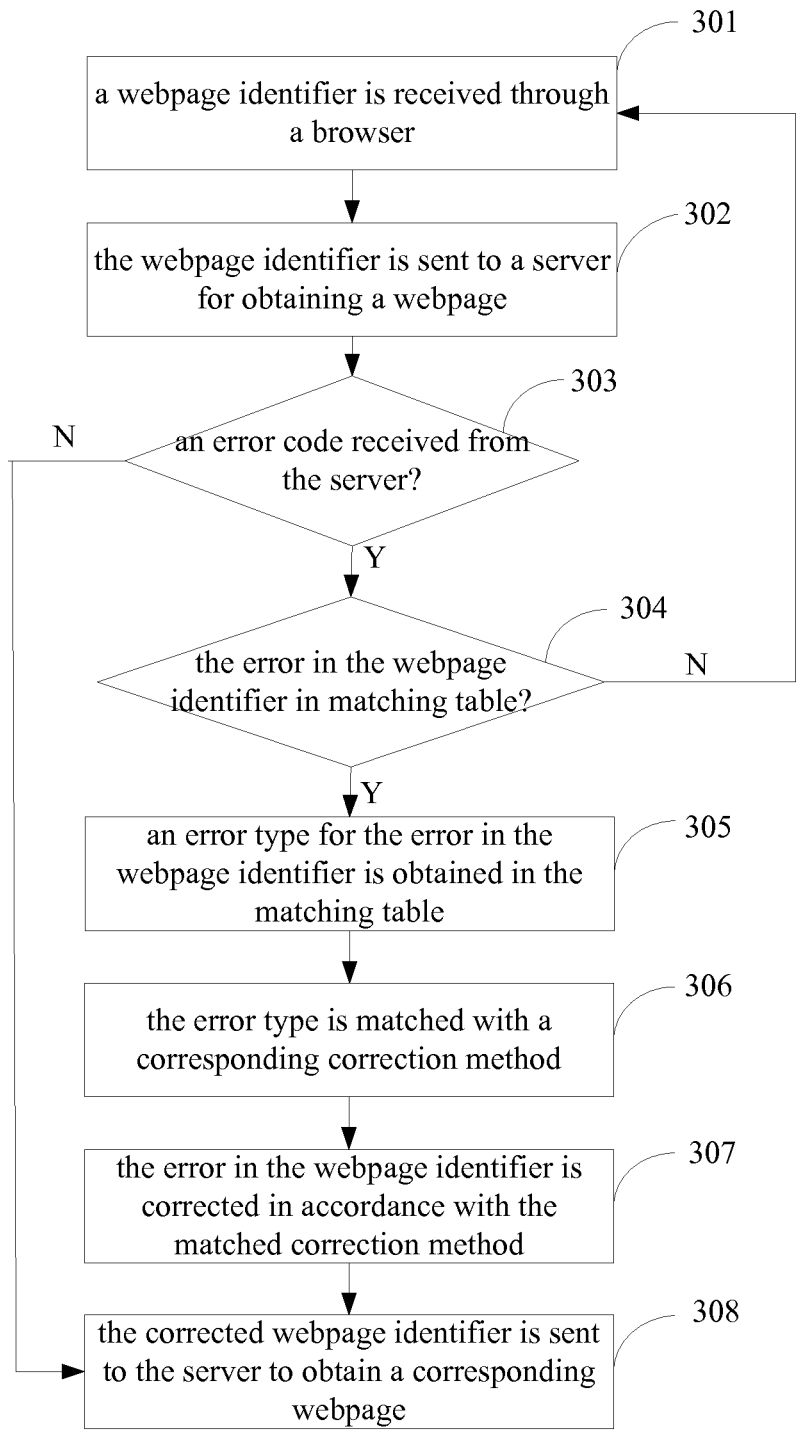
FIG. 3 is an exemplary flowchart of the method for obtaining a webpage in accordance with another embodiment of the present invention.

FIG. 3 is an exemplary flowchart of the method for obtaining a webpage in accordance with another embodiment of the present invention.

In step 301, a webpage identifier is received through a browser.

In step 302, the webpage identifier is sent to a server for obtaining a webpage.

The descriptions of step 101 and step 102 above can be referenced for implementation details of step 301 and step 302.

In step 303, it is determined whether an error code is received from the server; if so, step 304 is performed; otherwise, step 308 is performed.

Once an error code is received from the server, it can be determined that the current webpage identifier comprises an error. When a webpage identifier cannot be resolved by the DNS server, an error code (e.g., error 753) will be returned to the browser, indicating that the web address contains an error.

In step 304, it is determined whether the error in the webpage identifier is in the matching table for webpage identifier errors, if so, step 305 is performed; otherwise, step 301 is performed again.

In step 305, an error type for the error in the webpage identifier is obtained in the matching table for webpage identifier errors.

As shown in Table 1, the error types for the error in the webpage identifier includes but not limited to: error on punctuation in the webpage identifier, error on the format of punctuation in the webpage identifier, and error on presence of a character between two punctuations. In addition, each error type has a corresponding correction method which can correct the error in the webpage identifier.

In step 306, the error type is matched with a corresponding correction method.

In step 307, the error in the webpage identifier is corrected in accordance with the matched correction method to obtain a correct webpage identifier.

For example, if the error type for the error in the webpage identifier is an error on punctuation such as "http;", then the "http;" will be replaced with "http:" in accordance with the corresponding correction method for this error type.

In step 308, the corrected webpage identifier is sent to the server to obtain a corresponding webpage.

In the method for obtaining a webpage in accordance with an embodiment of the present invention, the step of determining whether the webpage identifier comprises an error comprises: determining whether the webpage identifier comprises a character that is not an allowed URL character; and if the webpage identifier comprises a character that is not an allowed URL character, replacing the character in the URL with a corresponding allowed URL character.

In the method for obtaining a webpage in accordance with another embodiment of the present invention, the step of determining whether the webpage identifier comprises an error comprises: determining whether the webpage identifier comprises a character that is not an allowed URL character; and if the webpage identifier comprises a character that is not an allowed URL character, deleting the character in the URL.

In this embodiment, when an error code is received from a server, it is determined that the webpage identifier sent to the server comprises an error; and an error type is obtained and matched with a corresponding correction method in a matching table for webpage identifier errors; then the error in the webpage identifier is corrected in accordance with the corresponding correction method, and finally, the corrected webpage identifier is sent to the server to obtain a corresponding webpage. Thus, errors in the webpage identifier can be automatically corrected in accordance with embodiments of the present invention, which saves time and enhances the browsing experiences.

Figure 4:
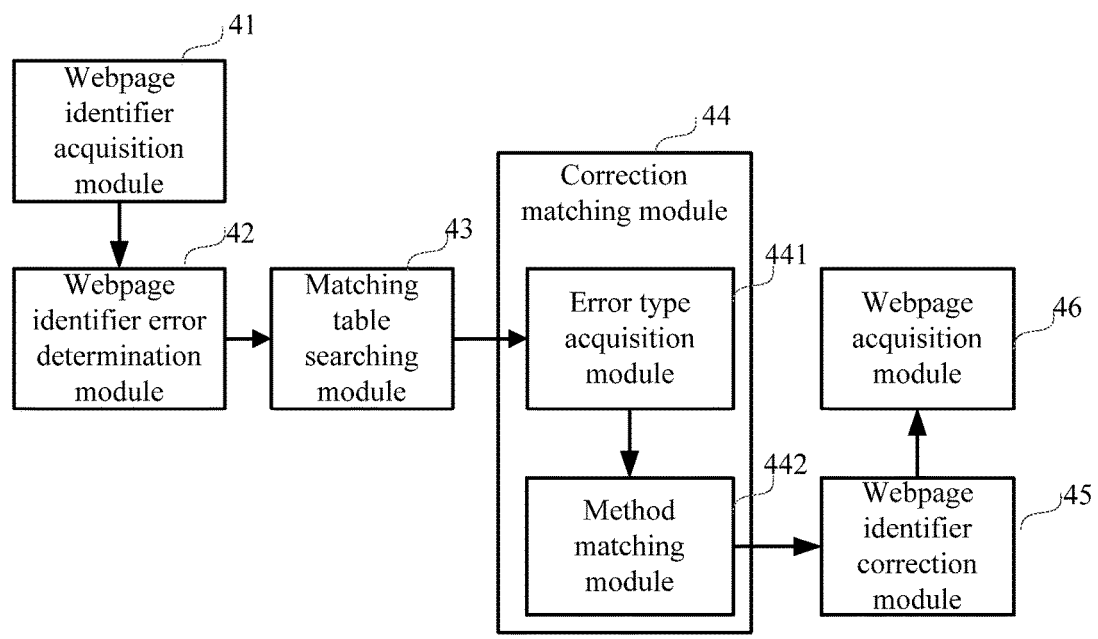
FIG. 4 is an exemplary structural diagram of the apparatus for obtaining a webpage in accordance with an embodiment of the present invention.

FIG. 4 is an exemplary structural diagram of the apparatus for obtaining a webpage in accordance with an embodiment of the present invention. The apparatus comprises: a webpage identifier acquisition module 41, a webpage identifier error determination module 42, a matching table searching module 43, a correction method matching module 44, a webpage identifier correction method module 45 and a webpage acquisition module 46.

In this embodiment, the webpage identifier acquisition module 41 is configured for receiving a webpage identifier through a browser; the webpage identifier error determination module 42 is configured for determining whether the webpage identifier comprises an error, wherein the webpage identifier preferably is an URL.

The matching table searching module 43 is configured for, if the webpage identifier comprises an error, further determining whether the error in the webpage identifier is in a pre-stored matching table for webpage identifier errors.

The correction method matching module 44 is configured for, if the error in the webpage identifier is in a pre-stored matching table for webpage identifier errors, further matching the error with a corresponding correction method in the pre-stored matching table for webpage identifier errors. The webpage identifier correction method module 45 is configured for correcting the webpage identifier in accordance with the matched correction method to generate a correct webpage identifier. The webpage acquisition module 46 is configured for sending the corrected webpage identifier to a server to obtain a corresponding webpage.

In a preferred embodiment, the webpage acquisition module 46 sends a website identifier to a server, if an error code is received from the server, then the webpage identifier error determination module 42 determines that the webpage identifier comprises an error.

In a preferred embodiment, the correction method matching module 44 comprises an error type acquisition module 441 and a method matching module 442, wherein the error type acquisition module 441 is configured for obtaining an error type for the error in the webpage identifier; and the method matching module 442 is configured for matching the error type with a corresponding correction method in a pre-stored matching table for webpage identifier errors; and the webpage identifier correction method module 45 is configured for correcting the webpage identifier in accordance with the matched correction method to generate a correct webpage identifier. The error types for the error in the webpage identifier includes but not limited to: error on punctuation in the webpage identifier, error on the format of punctuation in the webpage identifier, and error on presence of a character between two punctuations etc. FIG. 2 can be referenced for further details.

In the apparatus for obtaining a webpage in accordance with an embodiment of the present invention, the step of determining whether the webpage identifier comprises an error comprises: determining whether the webpage identifier comprises a character that is not an allowed URL character; and if the webpage identifier comprises a character that is not an allowed URL character, replacing the character in the URL with a corresponding allowed URL character.

In the apparatus for obtaining a webpage in accordance with another embodiment of the present invention, the step of determining whether the webpage identifier comprises an error comprises: determining whether the webpage identifier comprises a character that is not an allowed URL character; and if the webpage identifier comprises a character that is not an allowed URL character, deleting the character in the URL.

The illustration of working principal among all the modules in an apparatus can reference to that of the method for obtaining a webpage in accordance with the above mentioned embodiments of the present invention.

In this embodiment, when an error code is received from a server, it is determined that the webpage identifier sent to the server comprises an error; and an error type is obtained and matched with a corresponding correction method in a matching table for webpage identifier errors; then the error in the webpage identifier is corrected in accordance with the corresponding correction method, and finally, the corrected webpage identifier is sent to the server to obtain a corresponding webpage. Thus, errors in the webpage identifier can be automatically corrected in accordance with embodiments of the present invention, which saves time and enhances the browsing experiences.

The various embodiments of the present invention are merely preferred embodiments, and are not intended to limit the scope of the present invention, which includes any modification, equivalent, or improvement that does not depart from the spirit and principles of the present invention, therefore, the scope of the present invention only is defined in accordance with the claims.

The invention claimed is:

1. A method for obtaining a webpage, comprising:
   at a computing device that is connected to the Internet:
      receiving a webpage identifier that has been entered by a user in an address bar of a browser, wherein the webpage identifier includes a sequence of multiple characters;
      scanning through the sequence of multiple characters that has been entered in the address bar of the browser to determine whether the webpage identifier entered by the user includes one or more Chinese punctuation marks;
      in accordance with a determination that the sequence of multiple characters includes a first Chinese punctuation mark, replacing the first Chinese punctuation mark in the sequence of multiple characters with a corresponding standard punctuation mark to generate a first webpage identifier;
      sending the first webpage identifier to a server to request a corresponding webpage; and
      in accordance with receipt of an error code from the server:
         comparing the first webpage identifier with a pre-stored matching table for webpage identifier errors to identify at least a first error in the first webpage identifier;
         matching the first error with a corresponding correction method in the pre-stored matching table for webpage identifier errors;
         correcting the first webpage identifier in accordance with the matched correction method; and
         sending the corrected first webpage identifier to the server to obtain a corresponding webpage.

2. The method of claim 1, wherein the step of matching the first error with a corresponding correction method in the pre-stored matching table for webpage identifier errors comprises:
   obtaining an error type for the first error in the first webpage identifier; and
   matching the error type with a corresponding correction method in the pre-stored matching table for webpage identifier errors.

3. The method of claim 2, further comprising, prior to the step of matching the error type with a corresponding correction method in the pre-stored matching table for webpage identifier errors:
   determining whether the first error in the webpage identifier is in the matching table for webpage identifier errors; and
   if the first error in the webpage identifier is in the matching table for webpage identifier errors, obtaining the error type for the error in the webpage identifier.

4. The method of claim 1, wherein the webpage identifier is an URL.

5. The method of claim 4, wherein the step of comparing the first webpage identifier with the pre-stored matching table for webpage identifier errors to identify at least the first error in the first webpage identifier comprises:
   determining whether the first webpage identifier comprises a character that is not an allowed URL character.

6. The method of claim 5, wherein correcting the first webpage identifier in accordance with the matched correction method includes:
   if the first webpage identifier comprises a character that is not an allowed URL character, replacing the character in the URL with a corresponding allowed URL character.

7. The method of claim 5, wherein correcting the first webpage identifier in accordance with the matched correction method includes:
   if the webpage identifier comprises a character that is not an allowed URL character, deleting the character in the URL.

* * * * *